UNITED STATES PATENT OFFICE.

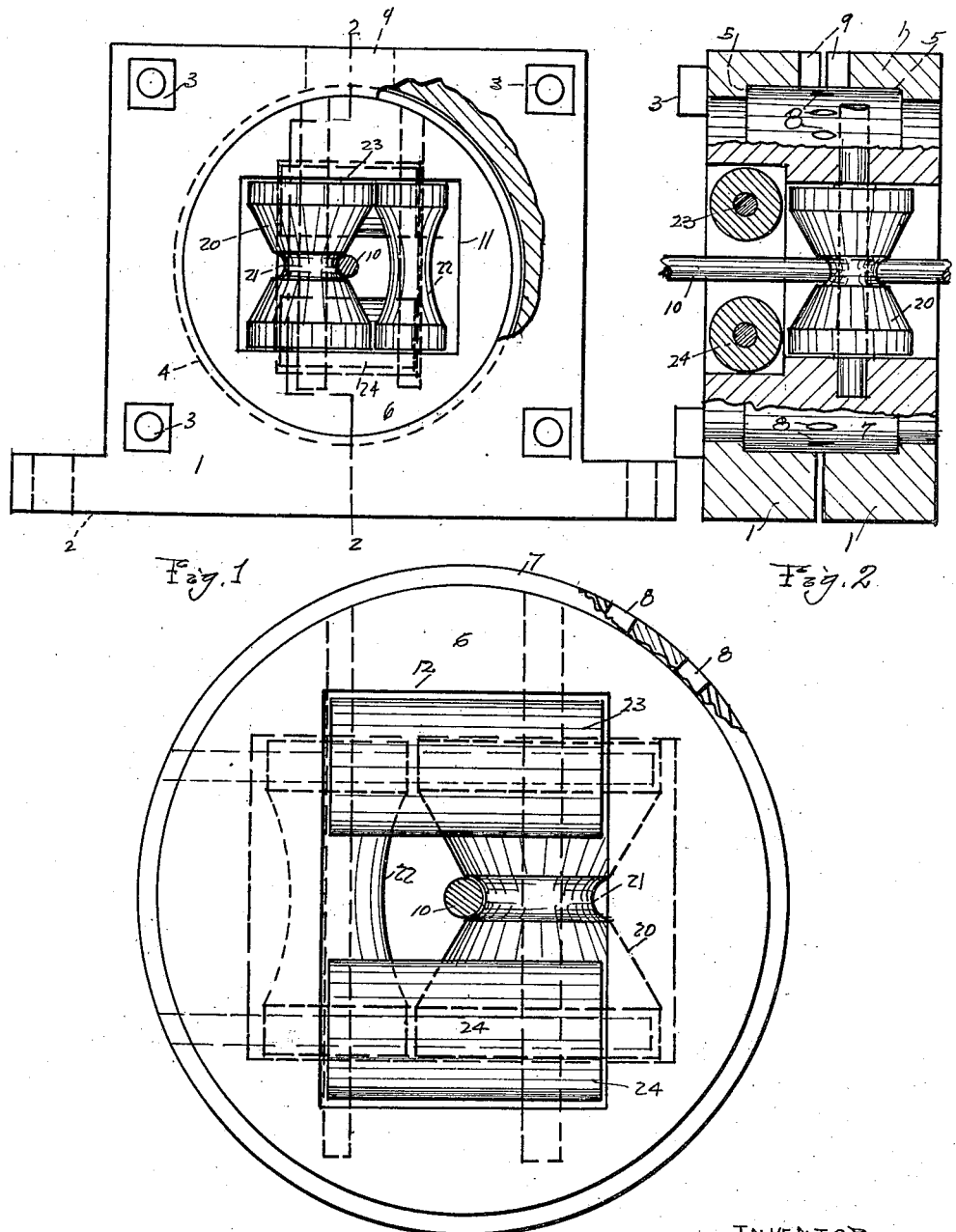

AARON J. JOHNSTON, OF PYSHT, WASHINGTON.

FAIR-LEADER.

1,392,687.

Specification of Letters Patent.   Patented Oct. 4, 1921.

Application filed April 30, 1921.   Serial No. 465,648.

*To all whom it may concern:*

Be it known that I, AARON J. JOHNSTON, a citizen of the United States, residing at Pysht, in the county of Clallam and State of Washington, have invented certain new and useful Improvements in Fair-Leaders, of which the following is a specification.

This invention relates to fair-leaders especially adapted for use in the logging industry, wherein logs are hauled in by cable at constantly varying angles, and has for its objects the provision of a device in this class of simple and compact mechanism, which will effectively maintain the cable in proper position for winding on the drum of a logging engine, or the like; one that will accommodate itself to any angle required, and will minimize the wear on the cable and prevent its distortion under strain.

In the accompanying drawings—

Figure 1 is a front elevation of the device, with a portion of the frame broken away, and showing a section of cable in operative position.

Fig. 2 is an end view of the same, partly broken away, with the two oppositely located halves, of which the frame is composed, slightly separated. A sectional view taken on the line 2—2 of Fig. 1 is also shown.

Fig. 3 is an enlarged view of a cylindrical member rotatable within the frame, and in which the main sheave, an auxiliary sheave and a pair of guide rolls for a cable are mounted; a section of cable in place also being shown. This view of said member is the reverse of that indicated in Fig. 1.

Referring more particularly to the drawings, 1 denotes the frame, which is provided with an integral base, and, as indicated in Fig. 2 the frame comprises two equal portions. These are held together and the interior mechanism retained by the bolts 3. The casing, as shown at 4, has a circular opening which extends through both sections thereof, each half being provided with a circumferentially extending recessed portion, which, when the two parts are bolted together, aline and form a guideway 5, Fig. 2. Mounted within these openings is a cylindrical member 6 having a centrally located peripheral guide section 7 complementary to the guideway 5 and adapted to rotate therein.

8 denotes a plurality of recesses extending the length of the guide section, by which the member 6 can be manually adjusted, as hereinafter described, through the opening 9 in the top of the frame. The cable shown in place is designated as 10, and the openings in said member through which the cable passes are, in this embodiment of the invention, substantially rectangular in form and indicated by 11 and 12.

The sheave 20, journaled in the member 6 and designed to carry the cable 10, departs from the usual form of sheaves in devices of this kind, in that it tapers toward the center from each end and is provided in its medial portion with a groove 21 adapted to hold the cable therein and in operative position under the most severe strain. It will be noted from the location of the cable 10, in Fig. 3, that the sheave is so mounted in the member 6 that when the cable is in proper position thereon it will be located approximately in the center of said member, so as to equalize the strain on the member and to facilitate its rotation.

22 denotes a smaller and auxiliary sheave journaled in the member and located at the side of the sheave just described. Rearwardly of the two sheaves, and located in transverse relation thereto, are two rolls 23 and 24 rotatably mounted in said member 6. This member, rotatable in the frame, is designed to automatically adjust the sheave, by virtue of the pull from the cable it carries, to any required angle, the chief function of the auxiliary sheave and the two rolls being to act as guides to protect the cable and the frame while the member 6 is turning within the frame and adjusting itself to a change in angle. If it is desirable to adjust and anchor the sheave to any fixed angle this may be accomplished manually by inserting a suitable tool in one of the recesses 8, through the opening 9 in the top of the frame, and turning the member to desired position. The tool, left in the recess and in contact with the frame, will keep the member 6 and the sheaves and guides in any predetermined location.

Fair-leaders equipped with straight spools subject to strain have a tendency to flatten the cable and thus impair its usefulness. Nor will they permit the cable to wind properly on the drum at some angles, on account of the difficulty in so placing them as to be in proper relation with the drum. I obviate these objections by utilizing a tapered sheave having the groove, in the form set forth, the tapered portions permitting the cable to readily adjust itself to the required angle, and the groove effectively holding the cable in its adjusted position and protecting its contour under strain. While the auxiliary sheave and the guide rolls coöperate with the main sheave in locating the cable in changed position, it is evident that they exert no continued or severe strain thereon.

The simple construction of the two-part frame gives it great rigidity and strength, permits the device to be easily assembled or taken apart, and, so far as known to me, provides a wider and stronger bearing for a rotatable part subject to strain, than is to be found in any other mechanism of this class.

I claim:

1. A device of the class described, comprising in combination, a frame and an integral base consisting of two upright members of identical construction adapted to be bolted together, a circular opening through the side of each member, each provided with a circumferentially extending and interiorly facing recess adapted to aline and define a centrally located guideway for a cylindrical member mounted therein, a cylindrical member having a circumferentially extending upstanding section complementary to said recess and rotatable therein, said section provided with a plurality of recesses communicating with an opening in the top of the frame for manually rotating said cylindrical member, a central cable guide journaled in the cylindrical member and extending therethrough, comprising a sheave and guiding means adapted to retain a cable in operative position for winding on a drum and during change in angular positions of the sheave and cable.

2. A device of the class described, comprising a frame, rotatable therein a cylindrical member provided with an opening through its central portion, journaled within said member a sheave having a face tapering from each end toward its medial portion, said medial portion provided with a groove adapted to retain a cable while under strain and undergoing change in angular position, a guide sheave journaled within the member and located adjacent the first sheave, located rearwardly of said sheaves and in transverse relation thereto, a pair of spaced guide rolls rotatably mounted in said member, and means for attaching the device to a fixed object.

3. In a fair-leader having a frame, a cylindrical member mounted therein and adapted to rotate vertically in relation to the frame, a central way for a cable therethrough comprising a sheave journaled in the member and having a face tapering from each end toward its medial portion, said portion defining a circumferential recess adapted to retain a cable while the sheave is undergoing change in angular position, journaled in the member and adjacent said sheave a cable guide roll having a concave face, journaled in the member and located rearwardly of said sheave and guide roll, a pair of cable guide rolls in spaced parallel relation.

AARON J. JOHNSTON.